(12) United States Patent
Iwanaga

(10) Patent No.: US 12,731,241 B2
(45) Date of Patent: Sep. 8, 2026

(54) INFORMATION PROCESSING METHOD, INFORMATION PROCESSING APPARATUS, AND STORAGE MEDIUM

(71) Applicant: Tokyo Electron Limited, Tokyo (JP)

(72) Inventor: Shuji Iwanaga, Koshi City (JP)

(73) Assignee: Tokyo Electron Limited, Tokyo (JP)

( * ) Notice: Subject to any disclaimer, the term of this patent is extended or adjusted under 35 U.S.C. 154(b) by 254 days.

(21) Appl. No.: 18/718,559

(22) PCT Filed: Dec. 7, 2022

(86) PCT No.: PCT/JP2022/045083

§ 371 (c)(1),
(2) Date: Jun. 11, 2024

(87) PCT Pub. No.: WO2023/120189

PCT Pub. Date: Jun. 29, 2023

(65) Prior Publication Data

US 2025/0045906 A1 Feb. 6, 2025

(30) Foreign Application Priority Data

Dec. 21, 2021 (JP) ................................ 2021-206997

(51) Int. Cl.
*G06K 9/00* (2022.01)
*G06T 5/40* (2006.01)
(Continued)

(52) U.S. Cl.
CPC .............. *G06T 7/0008* (2013.01); *G06T 5/40* (2013.01); *G06V 10/44* (2022.01); *G06V 10/60* (2022.01); *G06T 2207/30148* (2013.01)

(58) Field of Classification Search
CPC ..................... G06T 7/0008; G06T 5/40; G06T 2207/30148; G06T 7/00; G06T 7/0004;
(Continued)

(56) References Cited

U.S. PATENT DOCUMENTS

2005/0240376 A1* 10/2005 Uwatoko ........... H04N 1/00015 702/183
2015/0125068 A1* 5/2015 Iwanaga ............... G06T 7/0004 382/149

FOREIGN PATENT DOCUMENTS

CN 1613156 A * 5/2005 ............. B82Y 20/00
CN 102449163 A * 5/2012 ........... G01N 27/447
(Continued)

OTHER PUBLICATIONS

International Search Report of the International Searching Authority mailed Jan. 31, 2023 in corresponding International Patent Application No. PCT/JP2022/045083 (and English translation).

*Primary Examiner* — Xin Jia
(74) *Attorney, Agent, or Firm* — Posz Law Group, PLC

(57) ABSTRACT

An information processing method of processing information for inspecting a substrate based on a captured image of the substrate, includes: acquiring the captured image of the substrate; creating a two-dimensional histogram using a distance from a center of the substrate and a luminance value as axes regarding the acquired captured image of the substrate; extracting a specific unevenness distribution corresponding to heterogeneous unevenness in the captured image from the two-dimensional histogram based on a predetermined domain definition; and acquiring a feature amount of the extracted specific unevenness distribution and determining a type of the specific unevenness distribution based on the feature amount.

15 Claims, 8 Drawing Sheets

(51) Int. Cl.
*G06T 7/00* (2017.01)
*G06V 10/44* (2022.01)
*G06V 10/60* (2022.01)

(58) Field of Classification Search
CPC .......... G06T 2207/20081; G06V 10/44; G06V 10/60; G06V 10/40; H10P 74/00; H10P 74/203; G01N 21/8851; G01N 21/9501; G01N 2021/8854; G01N 2021/8883; G01N 2021/8887
See application file for complete search history.

(56) References Cited

FOREIGN PATENT DOCUMENTS

| | | | | |
|---|---|---|---|---|
| JP | 2015-090964 | A | 5/2015 | |
| WO | WO-2023277219 | A1 * | 1/2023 | ............. G06V 20/59 |

* cited by examiner 1
2
3
4
5
6
M
10
11
12
13
C
20
21
θ
70
70a
90
90a
100
100a
R
F1
F2
G1
G2
G3
G4
X
Y 1
G1
G3
G4
4
5
3
2
11
100
64
63
62
61
60
33
32
31
30
F1
F2
57
56
55
54
53
52
51
50
21
C
13
12
Y 1
2
3
4
5
11
12
13
C
21
100
G2
G3
G4
D
40
41
42
50
51
52
53
54
55
56
57
60
61
62
63
70
80
Y

INFORMATION PROCESSING METHOD, INFORMATION PROCESSING APPARATUS, AND STORAGE MEDIUM

CROSS REFERENCE TO RELATED APPLICATION

This application is a U.S. national stage application of PCT/JP2022/045083 filed on Dec. 7, 2022, which is based on and claims the benefit of priority of the prior Japanese Patent Application No. 2021-206997 filed on Dec. 21, 2021, the entire contents of which are incorporated herein by reference.

TECHNICAL FIELD

This disclosure relates to an information processing method, an information processing apparatus, and a storage medium.

BACKGROUND ART

An apparatus disclosed in Patent Document 1 for analyzing a defect of a substrate has an imager which images a substrate to be inspected, a defect feature amount extractor which extracts a feature amount of the defect within the substrate based on a captured image of the substrate, and a defect feature amount integrator which integrates the feature amounts of the defects on a plurality of substrates. The apparatus further has a defect determiner which determines whether the integrated feature amounts exceed a predetermined threshold, and an outputter which outputs a determination result by the defect determiner.

PRIOR ART DOCUMENT

Patent Document

Patent Document 1: Japanese Laid-open Patent Publication No. 2015-90964

DISCLOSURE OF THE INVENTION

Problems to be Solved by the Invention

The technique according to this disclosure makes it possible to accurately perform an inspection based on a captured image of a substrate even if unevenness occurs in the captured image.

Means for Solving the Problems

An aspect of this disclosure is an information processing method of processing information for inspecting a substrate based on a captured image of the substrate, including: acquiring the captured image of the substrate; creating a two-dimensional histogram using a distance from a center of the substrate and a luminance value as axes regarding the acquired captured image of the substrate; extracting a specific unevenness distribution corresponding to heterogeneous unevenness in the captured image from the two-dimensional histogram based on a predetermined domain definition; and acquiring a feature amount of the extracted specific unevenness distribution and determining a type of the specific unevenness distribution based on the feature amount.

Effect of the Invention

According to this disclosure, it is possible to accurately perform an inspection based on a captured image of a substrate even if unevenness occurs in the captured image.

EMBODIMENTS FOR CARRYING OUT THE INVENTION

In a manufacturing process of a semiconductor device or the like, a resist coating treatment of applying a resist solution onto a substrate such as a semiconductor wafer (hereinafter, referred to as a "wafer") to form a resist film, an exposure treatment of exposing the resist film, a developing treatment of developing the exposed resist film, and so on are sequentially performed to form a resist pattern on the substrate. After the resist pattern forming treatment, etching and so on are performed on an etching target layer using the resist pattern as a mask to form a predetermined pattern on the etching target layer. Note that in the formation of the resist pattern, a film other than the resist film may be formed at a lower layer of the resist film.

Further, an inspection such as a defect inspection may be performed on the substrate when forming the resist pattern or when performing the etching using the resist pattern as above. In the defect inspection, for example, whether the resist pattern has been appropriately formed, whether there is adhesion of a foreign substance to the substrate, and the like are inspected. In recent years, a captured image obtained by imaging the front surface of the substrate may be used for the inspection such as the defect inspection.

However, the captured image of the substrate is affected by the state of a layer located lower than the outermost layer of the substrate, namely, a base, so that unevenness in color, namely, unevenness in luminance may occur even when the substrate is in a normal state. Depending on the inspection method, such unevenness is determined as an abnormality, so that the inspection cannot be accurately performed in some cases. In other words, it cannot be appropriately determined whether the unevenness in the captured image of the substrate is unevenness caused by the abnormality of the substrate or unevenness in a normal range causing no problem in terms of process performance in some cases.

The technique according to this disclosure is intended to accurately perform an inspection based on a captured image of a substrate even if unevenness occurs in the captured image.

Hereinafter, an information processing method and an information processing apparatus according to this embodiment will be explained with reference to the drawings. Note that, in this description and the drawings, components having substantially the same functional configurations are denoted by the same reference signs to omit duplicate explanations.

<Wafer Treatment System 1>

Figure 1:
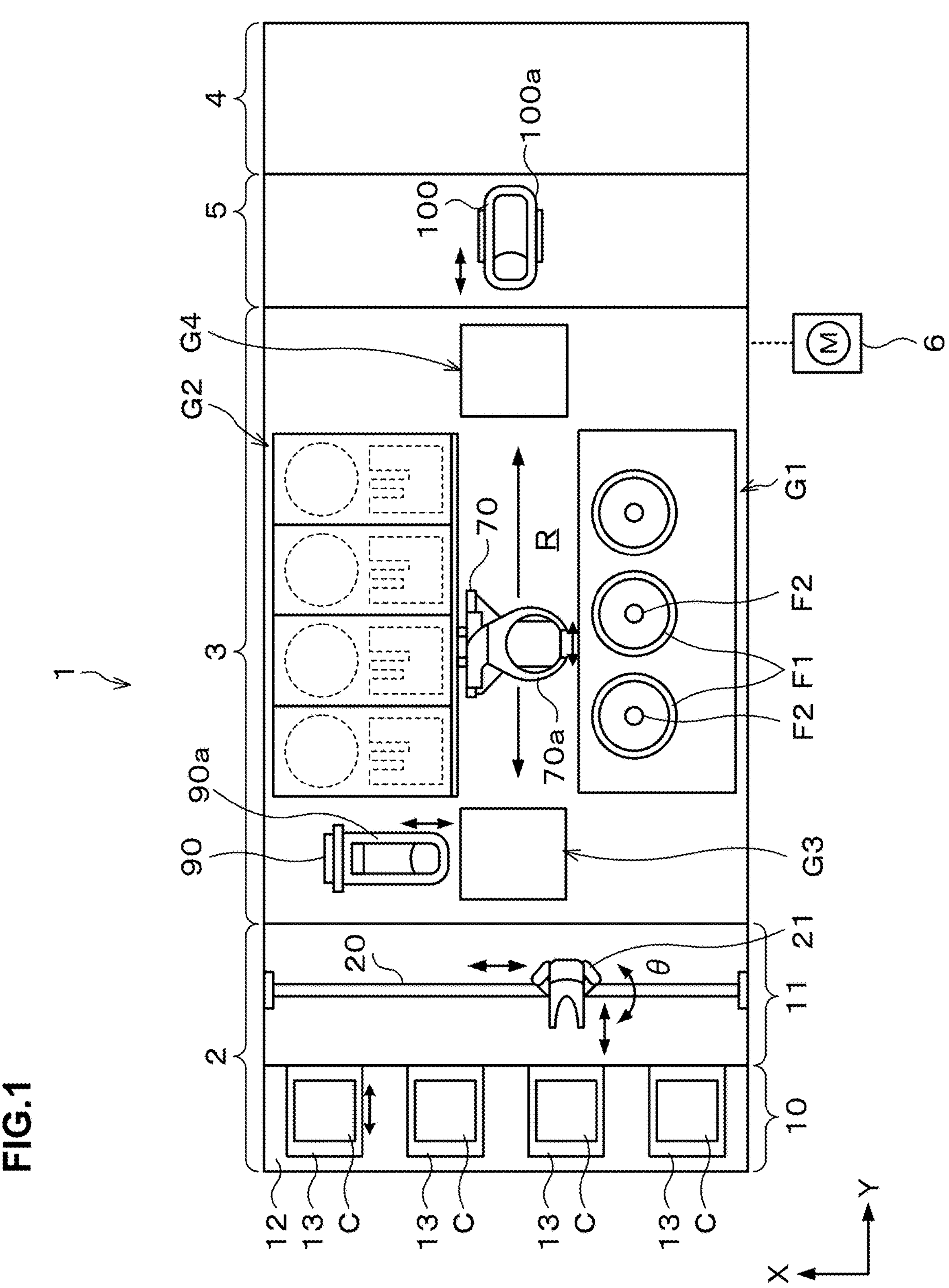
FIG. 1 is an explanatory view illustrating the outline of an internal configuration of a wafer treatment system as a substrate treatment system including a control apparatus as an information processing apparatus according to this embodiment.
Figure 2:
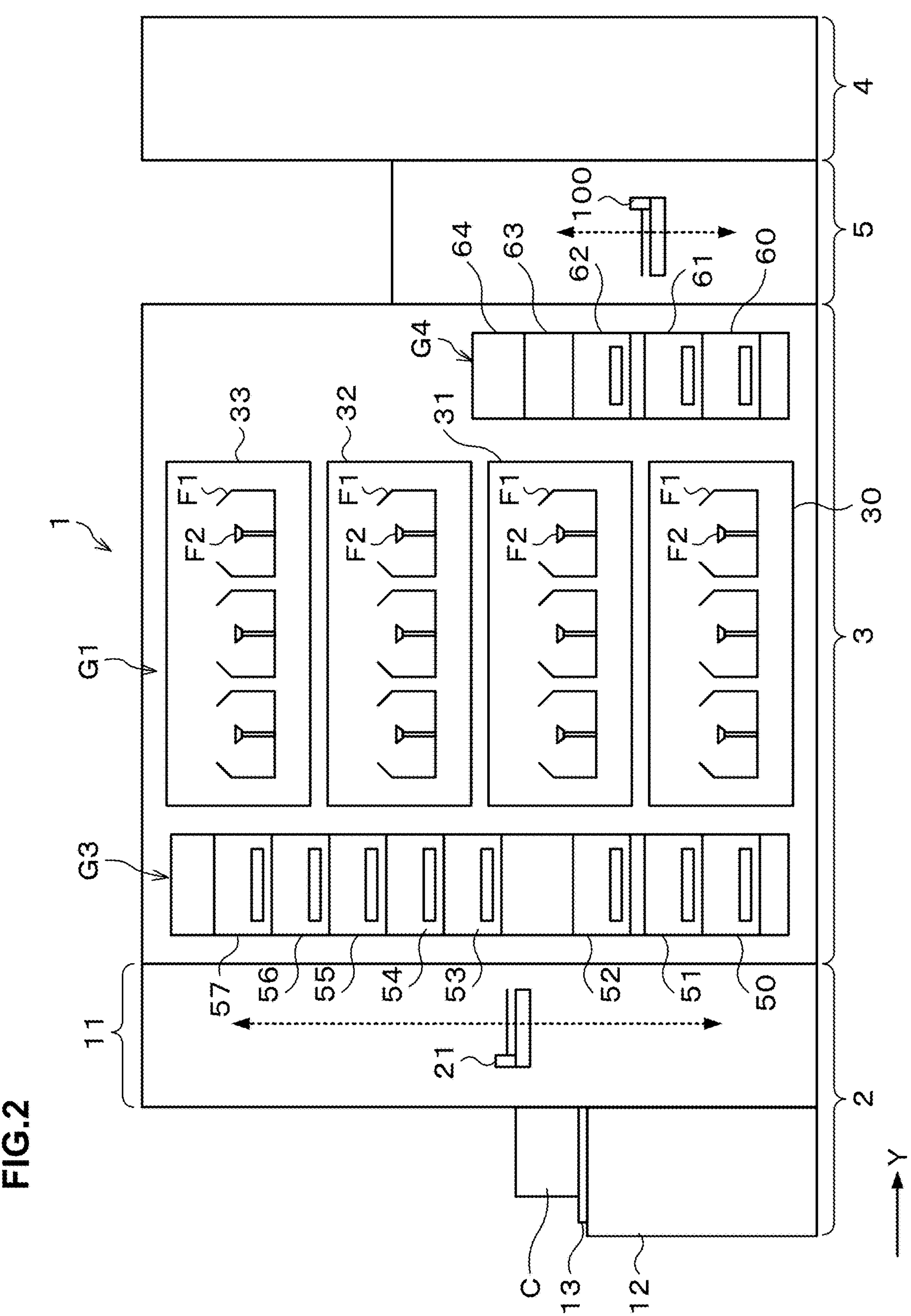
FIG. 2 is a view illustrating the outline of the internal configuration on the front side of the wafer treatment system.
Figure 3:
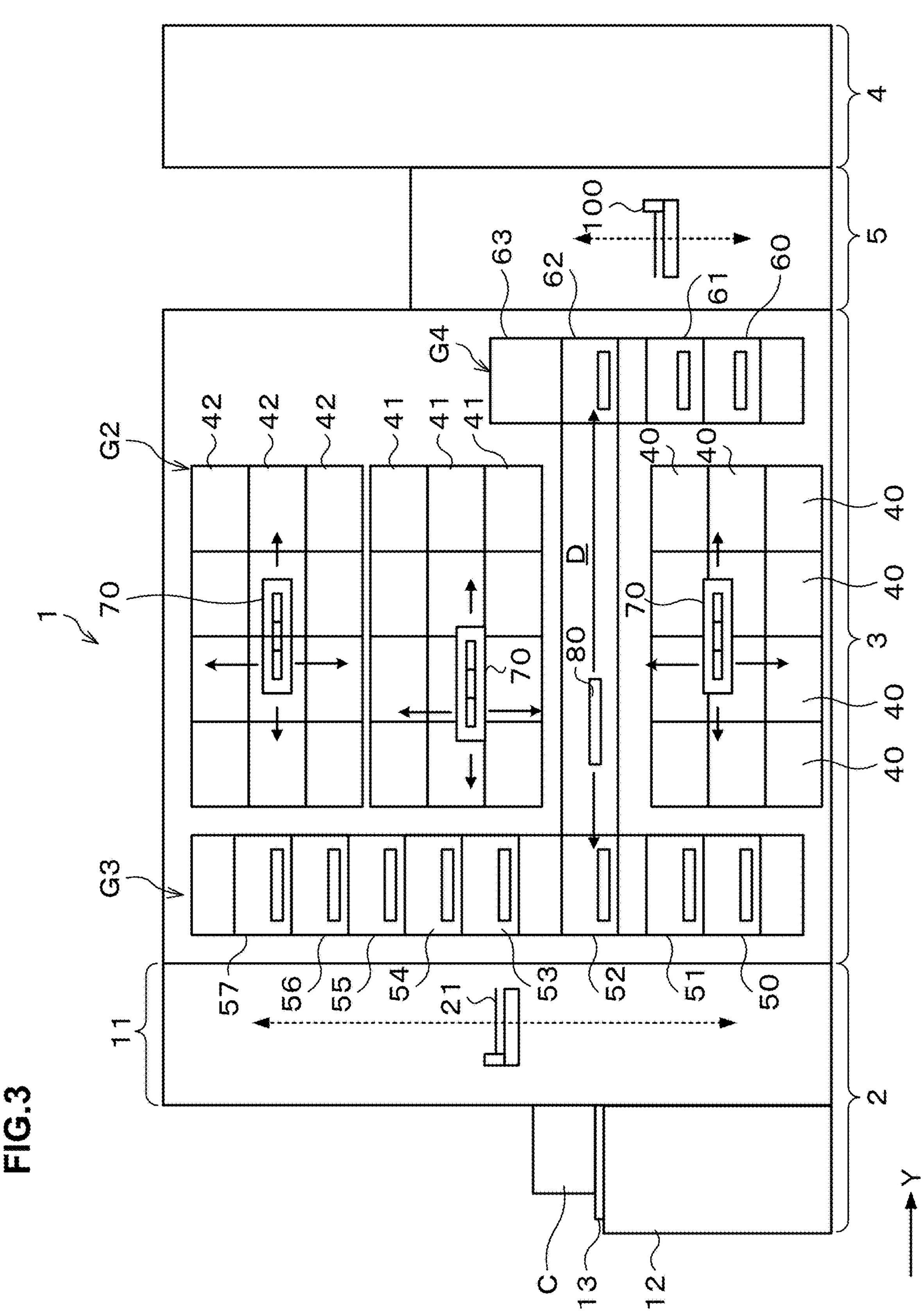
FIG. 3 is a view illustrating the outline of the internal configuration on the rear side of the wafer treatment system.

FIG. 1 is an explanatory view illustrating the outline of an internal configuration of a wafer treatment system as a substrate treatment system including a control apparatus as the information processing apparatus according to this embodiment. FIG. 2 and FIG. 3 are views illustrating the outline of the internal configuration on the front side and the rear side of a wafer treatment system 1, respectively. Note that in this embodiment, a case in which the wafer treatment system 1 is a coating and developing treatment system for performing photolithography processing on the wafer W as the substrate will be explained as an example.

The wafer treatment system 1 has, for example, a cassette station 2 into/out of which a cassette C is transferred from/to the outside, and a treatment station 3 including various treatment units which perform predetermined treatments on the wafer Was illustrated in FIG. 1. The wafer treatment system 1 has a configuration in which the cassette station 2, the treatment station 3, and an interface station 5 which delivers the wafer W to/from an exposure apparatus 4 adjacent to the treatment station 3 are integrally connected. Further, the wafer treatment system 1 has a control apparatus 6 which performs control of the wafer treatment system 1.

The cassette station 2 is divided into, for example, a cassette transfer-in/out section 10 and a wafer transfer section 11. The cassette transfer-in/out section 10 is provided, for example, at an end on a Y-direction negative side (left side in FIG. 1) in the wafer treatment system 1. In the cassette transfer-in/out section 10, a cassette stage 12 is provided. On the cassette stage 12, a plurality of, for example, four stage plates 13 are provided. The stage plates 13 are provided side by side in a row in an X-direction (up-down direction in FIG. 1) being a horizontal direction. On these stage plates 13, the cassettes C can be mounted when the cassettes C are transferred to/from the outside of the wafer treatment system 1.

In the wafer transfer section 11, a wafer transfer apparatus 21 is provided which is movable on a transfer path 20 extending in the X-direction (up-down direction in FIG. 1). The wafer transfer apparatus 21 is movable also in the up-down direction and around a vertical axis (in a θ-direction), and can transfer the wafer W between the cassette C on each of the stage plates 13 and a later-explained delivery apparatus in a third block G3 in the treatment station 3.

In the treatment station 3, a plurality of, for example, four blocks G1, G2, G3, G4 each including various apparatuses are provided. For example, the first block G1 is provided on the front side (X-direction negative side in FIG. 1) in the treatment station 3, and the second block G2 is provided on the rear side (X-direction positive side in FIG. 1) in the treatment station 3. Further, the third block G3 is provided on the cassette station 2 side (Y-direction negative side in FIG. 1) in the treatment station 3, and the fourth block G4 is provided on the interface station 5 side (Y-direction positive side in FIG. 1) in the treatment station 3.

In the first block G1, as illustrated in FIG. 2, a plurality of solution treatment apparatuses are arranged. Specifically, a developing treatment apparatus 30, a lower anti-reflection film forming apparatus 31, a resist coating apparatus 32, and an upper anti-reflection film forming apparatus 33 are arranged in this order from the bottom in the first block G1.

The developing apparatus 30 performs a developing treatment on the wafer W.

The lower anti-reflection film forming apparatus 31 forms an anti-reflection film (hereinafter, referred to as a "lower anti-reflection film") on a lower layer of the resist film of the wafer W.

The resist coating apparatus 32 applies a resist solution to the wafer W to form a resist film.

The upper anti-reflection film forming apparatus 33 forms an anti-reflection film (hereinafter, referred to as an "upper anti-reflection film") on an upper layer of the resist film of the wafer W.

Each of the solution treatment apparatuses 30 to 33 in the first block G1 has a plurality of cups F1 each housing the wafer W during the treatment in a horizontal direction, and can treat a plurality of wafers W in parallel.

Further, in the solution treatment apparatuses 30 to 33, predetermined treatment solutions are applied onto the wafer W, for example, by the spin coating method. In the spin coating method, the treatment solution is discharged onto the wafer W, for example, from a coating nozzle (not illustrated) and the wafer W is rotated to diffuse the treatment solution over the front surface of the wafer W. In each of the solution treatment apparatuses 30 to 33, the cup F1 and a spin chuck F2 as a rotary holder which holds and rotates the wafer W are provided. Further, the cup F1 can collect the treatment solution and the like shaken off from the rotating wafer W.

In the second block G2, as illustrated in FIG. 3, thermal treatment apparatuses 40 each of which performs a heat treatment and a cooling treatment on the wafer W, adhesion apparatuses 41 as hydrophobic treatment apparatuses each of which performs a hydrophobic treatment on the wafer W, and edge exposure apparatuses 42 each of which exposes an outer peripheral portion of the wafer W, are provided to line up in the up-down direction and in the horizontal direction. Note that the numbers and the arrangements of the thermal treatment apparatuses 40, the adhesion apparatuses 41, and the edge exposure apparatuses 42 can be arbitrarily selected.

In the third block G3, a plurality of delivery apparatuses 50, 51, 52, 53, 54 are provided in order from the bottom, and inspection imaging apparatuses 55, 56, 57 are provided thereon in order from the bottom. Further, in the fourth block G4, a plurality of delivery apparatuses 60, 61, 62 are provided in order from the bottom, and inspection imaging apparatuses 63, 64 are provided thereon in order from the bottom.

As illustrated in FIG. 1, in a region surrounded by the first block G1 to the fourth block G4, a wafer transfer region R is formed. In the wafer transfer region R, for example, a wafer transfer apparatus 70 is arranged.

The wafer transfer apparatus 70 has a transfer arm 70*a* movable, for example, in the Y-direction, a front-rear direction, the θ-direction, and the up-down direction. The wafer transfer apparatus 70 can move in the wafer transfer region R and transfer the wafer W to predetermined apparatuses in the first block G1, the second block G2, the third block G3, and the fourth block G4 therearound. A plurality of the transfer apparatuses 70 are arranged one above the other, for example, as illustrated in FIG. 3, each of which can transfer the wafer W, for example, to predetermined apparatuses at similar heights in each of the blocks G1 to G4.

Further, in the wafer transfer region R, a shuttle transfer apparatus 80 is provided which linearly transfers the wafer W between the third block G3 and the fourth block G4.

The shuttle transfer apparatus 80 can linearly move, for example, in the Y-direction in FIG. 3. The shuttle transfer apparatus 80 can move in the Y-direction while supporting the wafer W to transfer the wafer W between the delivery apparatus 52 in the third block G3 and the delivery apparatus 62 in the fourth block G4.

As illustrated in FIG. 1, a wafer transfer apparatus 90 is provided on the X-direction positive side of the third block G3. The wafer transfer apparatus 90 has a transfer arm 90*a* movable, for example, in the front-rear direction, the θ-direction, and the up-down direction. The wafer transfer apparatus 90 can move up and down while supporting the wafer W to transfer the wafer W to each of the delivery apparatuses in the third block G3.

In the interface station 5, a wafer transfer apparatus 100 is provided. The wafer transfer apparatus 100 has a transfer arm 100*a* movable, for example, in the front-rear direction, the θ-direction, and the up-down direction. The wafer transfer apparatus 100 can transfer the wafer W to each of the delivery apparatuses in the fourth block G4 and the exposure apparatus 4, for example, while supporting the wafer W by the transfer arm 100*a*.

The control apparatus 6 includes a computer including, for example, a processor such as a CPU, a memory, a communication interface, and so on, and has a program storage (not illustrated). The program storage stores a program including commands for controlling the operations of drive systems of the above various treatment apparatuses and transfer apparatuses to realize predetermined operations of the wafer treatment system 1, namely, the application of the resist solution on the wafer W, the development, the heat treatment, the delivery of the wafer W, the imaging of the wafer W, the control of each apparatus, and so on. In addition to the above, the program storage also stores a program including commands for information processing for inspecting the wafer W (for example, information processing and so on based on the imaging results of the wafer W by the inspection imaging apparatuses 55, 56, 57, 63, 64). In other words, the program storage also stores a program which runs on the computer of the control apparatus 6 of the wafer treatment system 1 which controls the information processing method based on the imaging results of the wafer W by the inspection imaging apparatuses 55, 56, 57, 63, 64. Note that the above programs may be the ones recorded in a computer-readable storage medium M and installed from the storage medium M into the control apparatus 6. The storage medium M may be a transitory one or a non-transitory one. Furthermore, some or all of the programs may be realized by dedicated hardware (circuit board).

<Inspection Imaging Apparatus 55>

Figure 4:
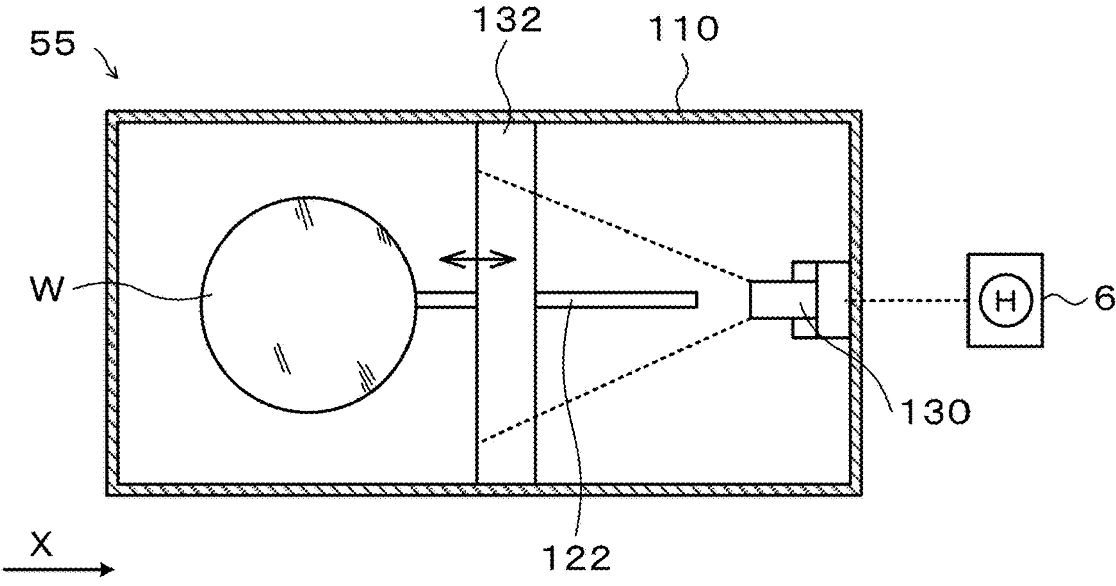
FIG. 4 is a transverse sectional view illustrating the outline of a configuration of an inspection imaging apparatus.
Figure 5:
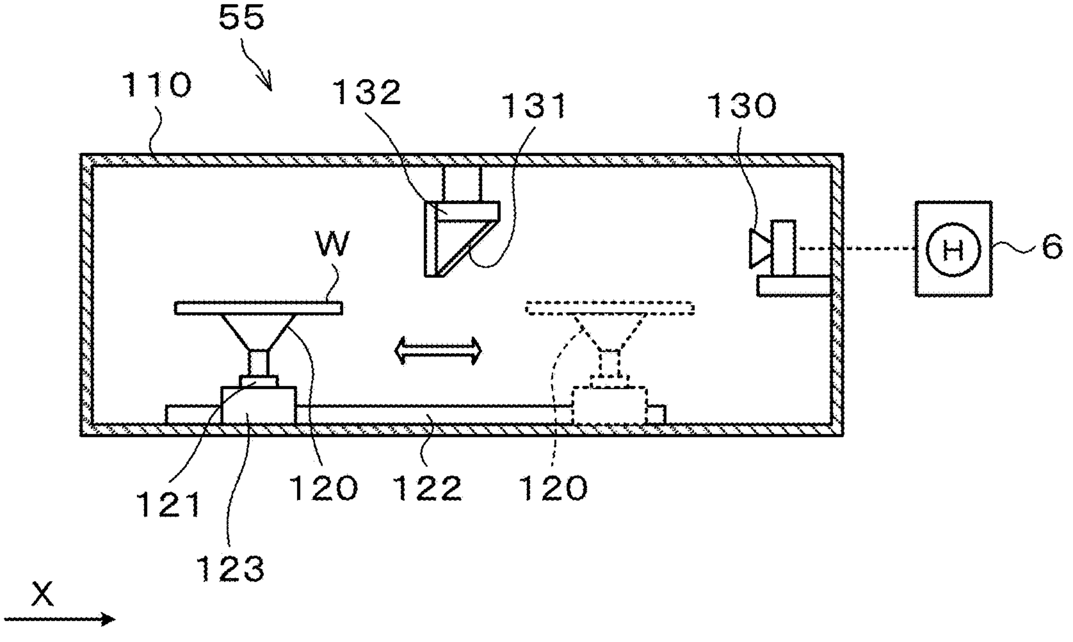
FIG. 5 is a longitudinal sectional view illustrating the outline of the configuration of the inspection imaging apparatus.

Next, the configuration of the inspection imaging apparatus 55 will be explained. FIG. 4 and FIG. 5 are a transverse sectional view and a longitudinal sectional view illustrating the outline of the configuration of the inspection imaging apparatus 55, respectively.

The inspection imaging apparatus 55 has a casing 110 as illustrated in FIG. 4. In the casing 110, a stage 120 on which the wafer W is mounted is provided as illustrated in FIG. 5. The stage 120 freely rotates and stops by a rotation drive 121 such as a motor. At a bottom of the casing 110, a guide rail 122 is provided which extends from one end side (X-direction negative direction side in FIG. 5) to another end side (X-direction positive direction side in FIG. 5) in the casing 110. The stage 120 and the rotation drive 121 are provided on the guide rail 122 and can move along the guide rail 122 by a drive 123.

On a side surface on the other end side (X-direction positive direction side in FIG. 5) in the casing 110, an imager 130 is provided. For the imager 130, for example, a wide-angle CCD camera is used, and the number of bits of the image is, for example, 8 bits (256 gradations of 0 to 255). Near the middle of the top of the casing 110, a half mirror 131 is provided. The half mirror 131 is provided at a position facing the imager 130 in such a state that its mirror surface is inclined upward at 45 degrees toward the imager 130 from a state of being directed vertically downward. Above the half mirror 131, an illuminator 132 is provided. The half mirror 131 and the illuminator 132 are fixed to the upper surface inside the casing 110. The illumination from the illuminator 132 passes through the half mirror 131 and is applied downward. Accordingly, light reflected from an object existing below the illuminator 132 is further reflected from the half mirror 131 and captured into the imager 130. In other words, the imager 130 can image the object existing within an irradiation region by the illuminator 132. Then, the imaging result by the imager 130 is input into the control apparatus 6.

The configurations of the inspection imaging apparatuses 56, 57, 63, 64 are the same as the configuration of the above inspection imaging apparatus 55, and therefore their explanation is omitted.

<Control Apparatus 6>

Figure 6:
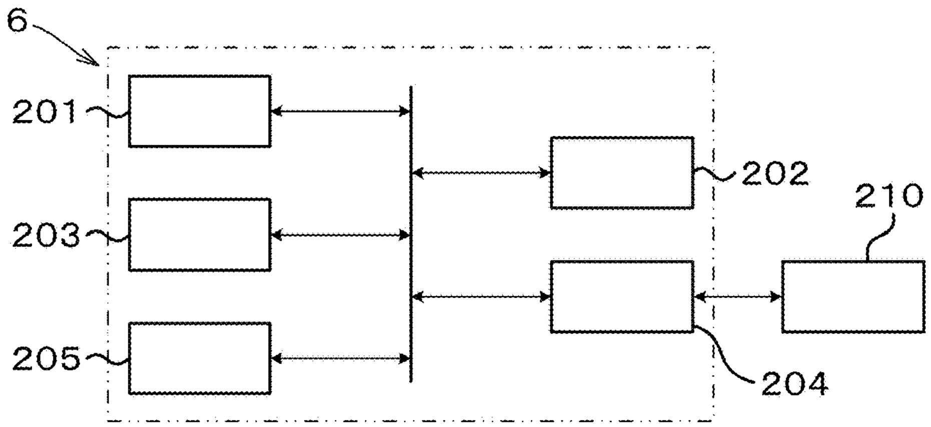
FIG. 6 is a functional block diagram of the control apparatus relating to an inspection in the wafer treatment system.
Figure 7:
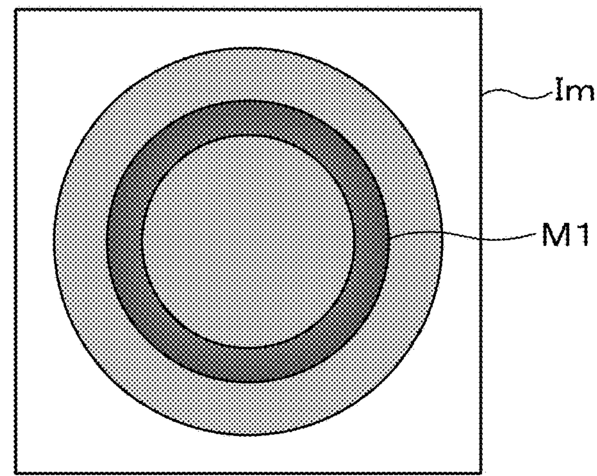
FIG. 7 is a view illustrating an example of a captured image of a wafer W.
Figure 8:
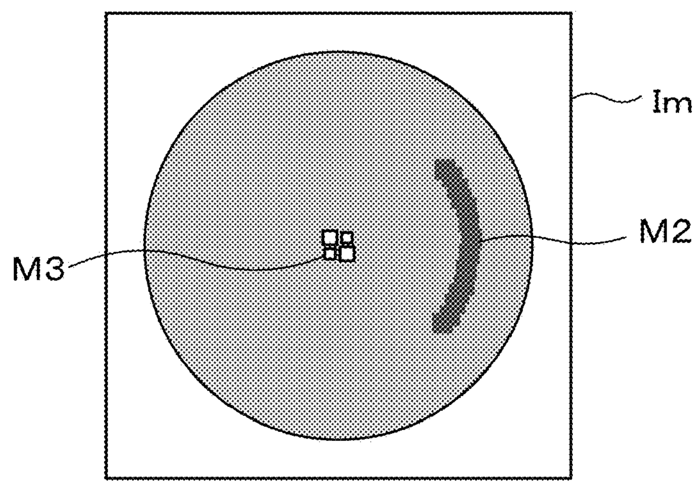
FIG. 8 is a view illustrating an example of the captured image of the wafer W.
Figure 9:
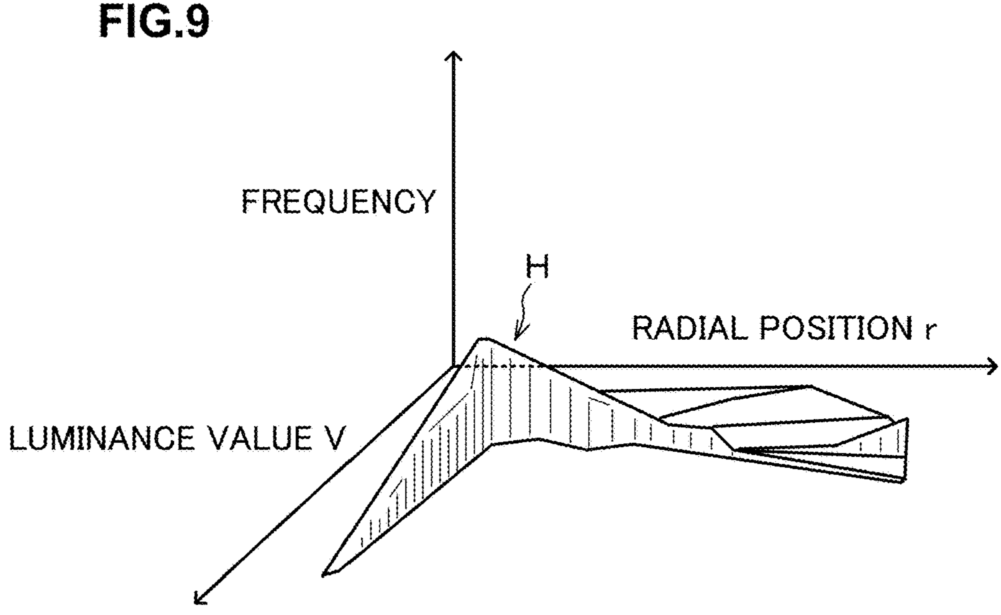
FIG. 9 is a chart illustrating an example of a two-dimensional histogram.
Figure 10:
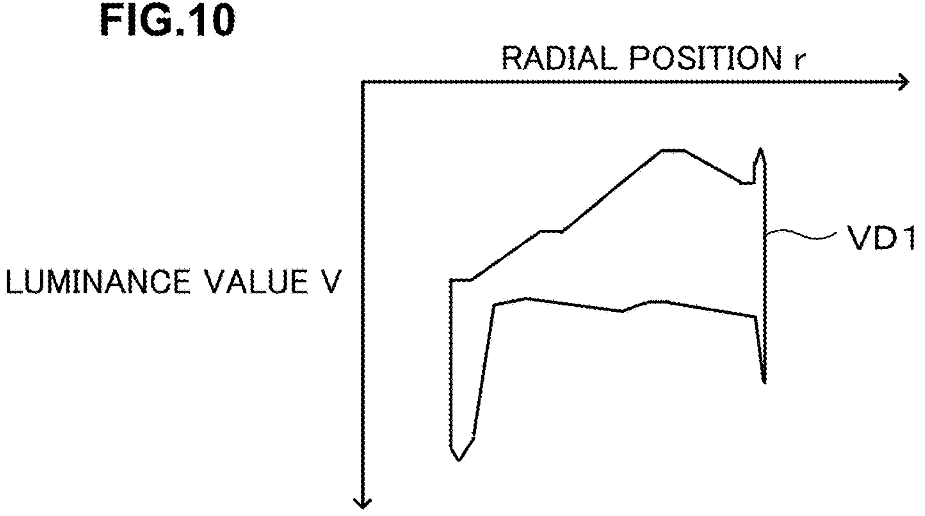
FIG. 10 is a chart illustrating an example of a luminance value distribution.
Figure 11:
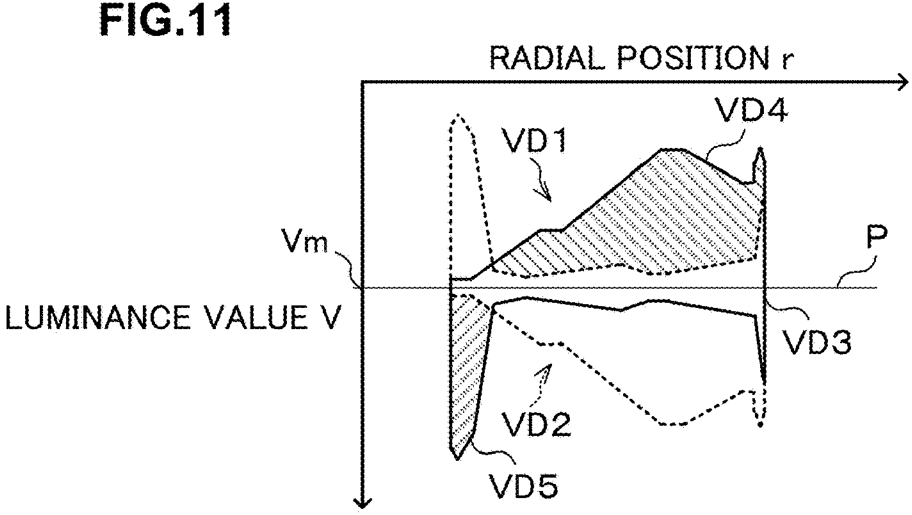
FIG. 11 is a chart illustrating an example of a specific unevenness distribution.

FIG. 6 is a functional block diagram of the control apparatus 6 relating to the inspection in the wafer treatment system 1. FIG. 7 and FIG. 8 are views illustrating examples of the captured image of the wafer W, respectively. FIG. 9 is a chart illustrating an example of a two-dimensional histogram created by a later-explained creator. FIG. 10 is a chart illustrating an example of a later-explained luminance value distribution. FIG. 11 is a chart illustrating an example of a later-explained specific unevenness distribution.

The control apparatus 6 has, as illustrated in FIG. 6, an acquirer 201, a creator 202, an extractor 203, and a determiner 204 which are realized by the processor such as the CPU reading and executing the program stored in the storage (not illustrated).

In one embodiment, the control apparatus 6 has a later-explained database 210.

The acquirer 201 acquires a captured image of the wafer W based on imaging results of the wafer W by the inspection imaging apparatuses 55, 56, 57, 63, 64. Specifically, the acquirer 201 performs required imaging processing on the images captured by the imagers 130 in the inspection imaging apparatuses 55, 56, 57, 63, 64 and thereby creates an image indicating the entire front surface of the wafer W as the captured image of the wafer W.

Note that there are many treatments involving the rotation of the wafer W such as the treatment by the spin coating method, the polishing treatment on the rear surface of the wafer W, and so on for the wafer W. Therefore, in a captured image Im of the wafer W, annular unevenness M1 or concentric unevenness centered on the center of the wafer W may occur as illustrated in FIG. 7 even if the wafer W is in a normal state. Besides, in the captured image Im of the wafer W, non-concentric annular and non-concentric unevennesses (namely, heterogeneous unevennesses) M2, M3 may occur as illustrated in FIG. 8. However, when the shapes of the unevennesses M2, M3 are non-concentric annular and non-concentric, the unevennesses M2, M3 are not always caused by the fact that the state of the wafer W is abnormal. For example, only the unevenness M2 of the unevennesses M2, M3 may be caused by the fact that the state of the wafer W is abnormal. In this case, inspection results need to be made different between a portion corresponding to the unevenness M2 and a portion corresponding to the unevenness M3 in the captured image Im in the inspection based on the captured image Im. Therefore, the following creator 202, extractor 203, and determiner 204 are provided.

The creator 202 creates a two-dimensional histogram H using a distance from the center of the wafer W (namely, a radial position centered on the wafer W) r and a luminance value V as axes as illustrated in FIG. 9.

The extractor 203 extracts a specific unevenness distribution D from the two-dimensional histogram H created by the creator 202, based on a predetermined domain definition. The specific unevenness distribution D is a distribution corresponding to the above heterogeneous unevennesses M2, M3 in the captured image Im of the wafer W.

Specifically, for example, the extractor 203 acquires a luminance value distribution VD1 as illustrated in FIG. 10 from the two-dimensional histogram H created by the creator 202. The luminance value distribution VD1 is a distribution obtained by projecting the two-dimensional histogram H created by the creator 202 on a two-dimensional plane using the distance from the center of the wafer W (radial position) r and the luminance value V as axes. In other words, the extractor 203 performs binarization processing on the two-dimensional histogram H created by the creator 202 to acquire the luminance value distribution VD1.

A portion around a mode value Vm of the luminance value V at each radial position in the luminance value distribution VD1 can be considered to correspond to the annular unevenness M1 or concentric unevenness centered on the center of the wafer W which occurs even when the wafer W is in a normal state.

Hence, the extractor 203 performs reversal processing regarding a luminance value axis direction on the luminance value distribution VD1 with the mode value of the luminance value as a reference. For example, the extractor 203 performs reversal processing centered on an axis P indicating the mode value of the luminance value in the luminance value distribution VD1, on the luminance value distribution VD1 to acquire a luminance value distribution VD2 after the reversal processing as illustrated in FIG. 11. In this embodiment, a portion D3 where the luminance value distribution VD1 before the reversal processing and the luminance value distribution VD2 after the reversal processing overlap with each other is regarded to correspond to the annular unevenness M1 or concentric unevenness centered on the center of the wafer W which occurs even when the wafer W is in a normal state. Accordingly, the portion VD3 where the luminance value distribution VD1 before the reversal processing and the luminance value distribution VD2 after the reversal processing overlap with each other is particularly unnecessary for the inspection, and therefore the extractor 203 extracts portions VD4, VD5 where the luminance value distribution VD1 before the reversal processing and the luminance value distribution VD2 after the reversal processing do not overlap with each other, as the specific unevenness distribution D. In other words, the extractor 203 extracts the portions VD4, VD5 in the luminance value distribution VD1 before the reversal processing not overlapping with the luminance value distribution VD2 after the reversal processing, as the specific unevenness distribution D.

Note that in the reversal processing, the extractor 203 may perform the reversal processing regarding the luminance value axis direction based on the mode value of the luminance value in a divided region for each of divided regions made by dividing the luminance value distribution VD1 in the radial direction of the wafer W (distance direction from the center of the wafer W).

The determiner 204 acquires feature amounts of the specific unevenness distribution D extracted by the extractor 203 (hereinafter, the specific unevenness distribution D extracted by the extractor 203 may be called an extracted unevenness distribution De), and determines the type of the extracted unevenness distribution De based on the feature amounts. Specifically, the determiner 204 determines which of the unevenness in the case where the state of the wafer W is normal, namely, the normal unevenness and the unevenness in the case where the state of the wafer W is abnormal, namely, the abnormal unevenness the extracted unevenness distribution De corresponds to. The abnormal unevenness is, for example, unevenness caused by a defect.

Further, the feature amounts of the specific unevenness distribution D are, specifically, feature amounts regarding the shape of the specific unevenness distribution D. The feature amounts regarding the shape of the specific unevenness distribution D are, for example, the following (A) to (I).

(A) Barycentric position of the specific unevenness distribution D (B) Coordinates of a quadrangle circumscribing the specific unevenness distribution D (C) Area of the specific unevenness distribution D (D) Circumferential length of the specific unevenness distribution D (E) Width in the luminance value axis direction of the specific unevenness distribution D (F) Radial width of the specific unevenness distribution D (G) Average luminance value of the specific unevenness distribution D (H) Irregularity degree of the outer shape of the specific unevenness distribution D (I) Edge histogram of the specific unevenness distribution D In one embodiment, the determiner 204 determines the type of the extracted unevenness distribution De by referring to the database 210. In the database 210, which of the normal unevenness and the abnormal unevenness the specific unevenness distribution D corresponds to, is stored (registered) in advance for each specific unevenness distribution D extracted from the past captured image of the wafer W. Hereinafter, the specific unevenness distribution D stored in advance in the database 210 may be called a registered unevenness distribution Dr. Further, in the database 210, the feature amounts of the registered unevenness distribution Dr are stored, for example, for each registered unevenness distribution Dr.

The determiner 204 specifies one of the registered unevenness distributions Dr most similar to the extracted unevenness distribution De, based on the feature amounts. For example, the determiner 204 calculates the similarity to the extracted unevenness distribution De based on the feature amounts for each registered unevenness distribution Dr by referring to the database 210, and specifies the registered unevenness distribution Dr with highest similarity. For the feature amounts used for the calculation of the similarity, a plurality of feature amounts among the aforementioned feature amounts (A) to (I) regarding the shape of the specific unevenness distribution D are used. Further, for the calculation of the similarity, for example, Euclidean distance, Mahalanobis' distance, Manhattan distance, Minkowski's distance, or cosine similarity is used.

Then, the determiner 204 determines which of the normal unevenness and the abnormal unevenness the extracted unevenness distribution De corresponds to, based on the fact that which of the normal unevenness and the abnormal unevenness the registered unevenness distribution Dr most similar to the extracted unevenness distribution De (namely, with highest similarity) is registered in the database 210 as corresponding to. In the case where the most similar registered unevenness distribution Dr is registered as corresponding to the normal unevenness, the determiner 204 determines that the extracted unevenness distribution De corresponds to the normal unevenness. On the other hand, in the case where the most similar registered unevenness distribution Dr is registered as corresponding to the abnormal unevenness, the determiner 204 determines that the extracted unevenness distribution De corresponds to the abnormal unevenness.

As illustrated, the control apparatus 6 may further have a register 205 which is realized by the processor such as the CPU reading and executing the program stored in the storage (not illustrated).

The register 205 registers a determination result by the determiner 204 in the database 210. Specifically, the register 205 stores the specific unevenness distribution D extracted by the extractor 203 in the database 210, together with the feature amounts extracted by the determiner 204 from the specific unevenness distribution D and the determination result by the determiner 204 with respect to the specific unevenness distribution D.

When the register 205 registers them, the determiner 204 performs, after the registration, the determination referring to the database 210 in which the determination results by the determiner 204 at previous and earlier times are registered.

<Wafer Treatment>

Next, the wafer treatment performed in the wafer treatment system 1 will be explained.

First, the cassette C housing a plurality of wafers W is transferred into the cassette station 2. Then, the wafer W in the cassette C is transferred to the inspection imaging apparatus 55 in the third block G3 under the control of the control apparatus 6. Then, the wafer W before various films such as the lower anti-reflection film are formed, namely, in an initial state is imaged by the imager 130. The imaging result is output to the control apparatus 6.

Next, the wafer W is transferred to the lower anti-reflection film forming apparatus 31 in the first block G1, in which a lower anti-reflection film is formed on the wafer W.

Subsequently, the wafer W is transferred to the thermal treatment apparatus 40 for lower anti-reflection film in the second block G2, in which a heat treatment of the lower anti-reflection film is performed.

Thereafter, the wafer W is transferred to the inspection imaging apparatus 63. The wafer W after the lower anti-reflection film formation is imaged by the imager 130. The imaging result is output to the control apparatus 6.

Next, the wafer W is transferred to the resist coating apparatus 32 in the first block G1, in which a resist film is formed on the lower anti-reflection film of the wafer W.

Subsequently, the wafer W is transferred to the thermal treatment apparatus 40 for PAB treatment in the second block G2, in which a PAB treatment is performed.

Thereafter, the wafer W is transferred to the inspection imaging apparatus 56. Then, the wafer W after the resist film formation is imaged by the imager 130. The imaging result is output to the control apparatus 6.

Next, the wafer W is transferred to the upper anti-reflection film forming apparatus 33 in the first block G1, in which an upper anti-reflection film is formed on the resist film of the wafer W.

Subsequently, the wafer W is transferred to the thermal treatment apparatus 40 for upper anti-reflection film in the second block G2, in which a heat treatment of the upper anti-reflection film is performed.

Thereafter, the wafer W is transferred to the inspection imaging apparatus 64. Then, the wafer W after the upper anti-reflection film formation is imaged by the imager 130. The imaging result is output to the control apparatus 6.

Next, the wafer W is transferred to the exposure apparatus 4 and exposed to a desired pattern.

Subsequently, the wafer W is transferred to the thermal treatment apparatus 40 for PEB treatment in the second block G2, in which a PEB treatment is performed.

Next, the wafer W is transferred to the developing treatment apparatus 30 in the first block G1, in which a developing treatment is performed to form a resist pattern on the wafer W.

Thereafter, the wafer W is transferred to the inspection imaging apparatus 57. Then, the wafer W after the resist pattern formation is imaged by the imager 130. The imaging result is output to the control apparatus 6.

Then, the wafer W is returned to the cassette C, with which a serial wafer treatment is completed. Thereafter, the above wafer treatment is performed also on the other wafers W.

<Information Processing and a Registration Method into the Database 210>

Next, the information processing for inspecting the wafer W including the information processing based on the imaging results of the wafer W by the inspection imaging apparatuses 55, 56, 57, 63, 64, and the method of registering the specific unevenness distribution D into the database 210 in advance of the information processing based on the imaging results will be explained.

Figure 12:
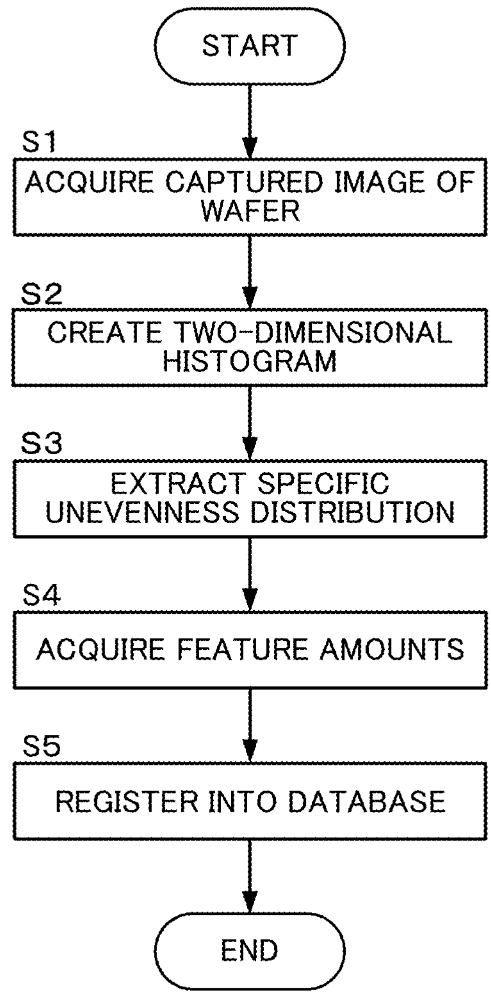
FIG. 12 is a flowchart illustrating a flow of a method of registering a specific unevenness distribution into a database 210 in advance of information processing based on imaging results of the wafer.

First, the method of registering into the database 210 in advance will be explained using FIG. 12. FIG. 12 is a flowchart illustrating a flow of the method of registering the specific unevenness distribution D into the database 210 in advance of the information processing based on the imaging results.

The registration of the specific unevenness distribution D into the database 210 in advance is performed using, for example, an external control apparatus (not illustrated) outside the wafer treatment system 1.

First, the external control apparatus acquires the captured image of the wafer W based on the imaging result of the wafer W by an inspection imaging apparatus (not illustrated) similar to the inspection imaging apparatuses 55, 56, 57, 63, 64 as with the above acquirer 201 (Step S1).

Subsequently, the external control apparatus creates a two-dimensional histogram H using a distance r from the center of the wafer W and a luminance value V as axes regarding the captured image of the wafer W acquired at Step S1 as with the above creator 202 (Step S2).

Next, the external control apparatus extracts a specific unevenness distribution D from the two-dimensional histogram H created at Step S2 based on a predetermined domain definition as with the above extractor 203 (Step S3).

Thereafter, the external control apparatus acquires the feature amounts of the specific unevenness distribution D extracted at Step S3 as with the above determiner 204 (Step S4).

Then, for example, the captured image of the wafer W acquired at Step S1 and the specific unevenness distribution extracted at Step S3 are displayed on a display device (not illustrated). Thereafter, an operator who has confirmed the display contents of the display device inputs which of the normal unevenness and the abnormal unevenness the specific unevenness distribution extracted at Step S3 corresponds to, via an input device such as a keyboard, a mouse, a touch panel, or the like.

In response to the input via an inputter (not illustrated) from the operator, the external control apparatus registers, about the specific unevenness distribution D extracted at Step S3, the information on which of the normal unevenness and the abnormal unevenness the specific unevenness distribution corresponds to, into the database 210 (Step S5). In this event, the external control apparatus registers also the feature amounts acquired at Step S4 about the specific unevenness distribution, in association with the specific unevenness distribution, into the database 210. Further, the external control apparatus may register wafer identification information (ID), lot identification information (ID), and device identification information (ID) regarding the wafer W whose specific unevenness distribution has been acquired from the captured image, in association, into the database 210. The device identification information (ID) corresponds to information on a lower layer film of the imaged wafer W (for example, a type of the lower-layer film, the number of lower-layer films, and so on).

The above Step S1 to Step S5 are performed for each of the plurality of wafers W.

Figure 13:
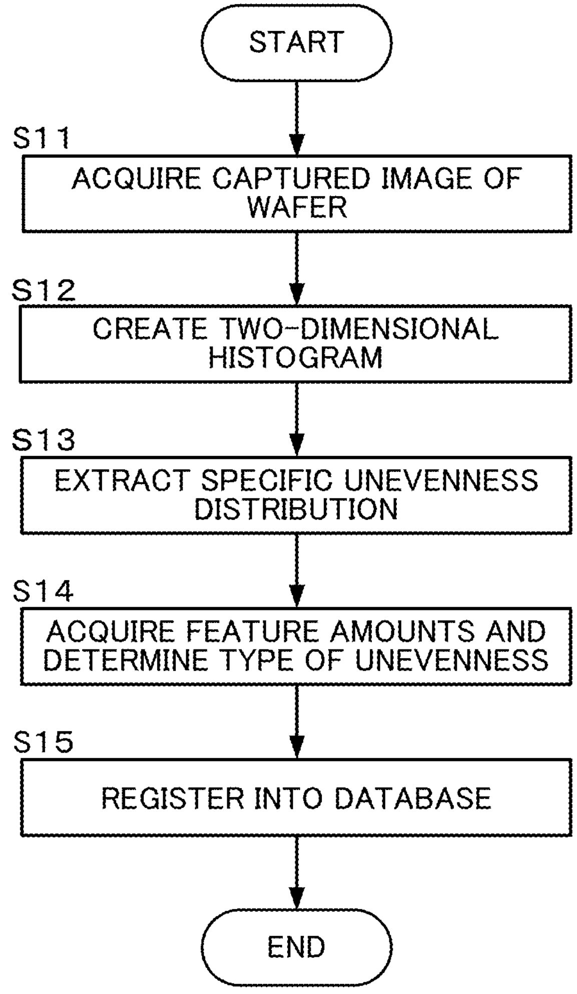
FIG. 13 is a flowchart illustrating a flow of information processing for inspecting the wafer including information processing based on an imaging result of a wafer W by an inspection imaging apparatus.

Next, the information processing for inspecting the wafer W including the information processing based on the captured image of the wafer W by the inspection imaging apparatus 56 of the wafer treatment system 1 will be explained using FIG. 13. FIG. 13 is a flowchart illustrating a flow of the information processing for inspecting the wafer W including the information processing based on the imaging result of the wafer W by the inspection imaging apparatus 56.

The acquirer 201 of the control apparatus 6 in the wafer treatment system 1 acquires the captured image of the wafer W based on the imaging result of the wafer W after the resist film formation by the inspection imaging apparatus 56 (Step S11).

Subsequently, the creator 202 of the control apparatus 6 creates a two-dimensional histogram H using a distance r from the center of the wafer W and a luminance value V as axes regarding the captured image of the wafer W after the resist film formation acquired by the acquirer 201 (Step S12). In creating the two-dimensional histogram H, a radial image may be used. The radial image is an image in which the luminance value linearly monotonically increases or monotonically decreases radially outward from a portion corresponding to the center of the wafer W, and the luminance value in the radial image corresponds to a radial position of the wafer W. Here, it is assumed that the coordinate of a portion where the wafer W exists in the captured image of the wafer W is a point (xn, yn). By plotting (the luminance value at the point (xn, yn) in the captured image of the wafer W, the luminance value at (xn, yn) in the radial image) for all points (xn, yn) in a three-dimensional space using the distance r from the center of the wafer W, the luminance value V, and frequency as axes, the above two-dimensional histogram H can be obtained. The two-dimensional histogram H can be easily created by using the concentric image.

Next, the extractor 203 of the control apparatus 6 extracts the specific unevenness distribution D from the two-dimensional histogram H created by the creator 202 based on the predetermined domain definition (Step S13). Specifically, for example, the extractor 203 acquires the above luminance value distribution VD1 from the two-dimensional histogram H created by the creator 202. Further, the extractor 203 performs the reversal processing centered on the axis P indicating the mode value of the luminance value in the luminance value distribution VD1, on the luminance value distribution VD1 to acquire the luminance value distribution VD2 after the reversal processing. Then, the extractor 203 extracts a portion in the luminance value distribution VD1 before the reversal processing which does not overlap with the luminance value distribution VD2 after the reversal processing, as the specific unevenness distribution D. Note that the extractor 203 may extract one or a plurality of specific unevenness distributions.

Thereafter, the determiner 204 acquires the feature amounts of the extracted unevenness distribution De for each of the specific unevenness distributions D extracted by the extractor 203, namely, the extracted unevenness distributions De, and determines the type of the extracted unevenness distribution De based on the feature amounts (Step S14).

Specifically, the determiner 204 acquires all of the above feature amounts (A) to (I) regarding the shape of the extracted unevenness distribution De for each extracted unevenness distribution De. Hereinafter, the feature amounts (A) to (I) are collectively called a feature amount group.

Next, the determiner 204 specifies, for each extracted unevenness distribution De, the registered unevenness distribution Dr most similar to the extracted unevenness distribution De among the specific unevenness distributions D registered in the database 210, namely, the registered unevenness distributions Dr, based on the feature amount group regarding the shape of the extracted unevenness distribution De extracted by the determiner 204. For example, the determiner 204 calculates the similarity to the extracted unevenness distribution De based on the feature amount group for each registered unevenness distribution Dr by referring to the database 210, and specifies the registered unevenness distribution Dr with highest similarity. For the calculation of the similarity based on the similarity group, for example, Euclidean distance, Mahalanobis' distance, Manhattan distance, or Minkowski's distance from the feature amount group regarding the shape of the extracted unevenness distribution De to the feature amount group regarding the shape of the registered unevenness distribution Dr is used.

Note that the calculation of the similarity may be performed on all of the registered unevenness distributions Dr, but may be performed only on the registered unevenness distribution Dr corresponding to the wafer ID, the lot ID, or the device ID of the wafer W being an inspection target among the registered unevenness distributions Dr.

Then, the determiner 204 determines which of the normal unevenness and the abnormal unevenness the extracted unevenness distribution De corresponds to, based on the fact that which of the normal unevenness and the abnormal unevenness the registered unevenness distribution Dr with high similarity is registered in the database 210 as corresponding to. The determination result by the determiner 204 may be displayed on a display device (not illustrated) such as a liquid crystal display panel.

Note that in the case where the acquired feature amounts of the extracted unevenness distribution De are not within predetermined ranges but indicate abnormal values, the determiner 204 does not need to calculate the similarity but may determine that the extracted unevenness distribution De corresponds to the abnormal unevenness.

Further, also in the case where the extracted unevenness distribution De does not continue to a portion VD3 where the luminance value distribution VD1 before the reversal processing and the luminance value distribution VD2 after the reversal processing overlap with each other (namely, in the case where the extracted unevenness distribution De exists in isolation), the determiner 204 does not need to calculate the similarity but may determine that the extracted unevenness distribution De corresponds to the abnormal unevenness. Note that in the case where not only the extracted unevenness distribution De does not continue to the portion VD3 where the luminance value distribution VD1 before the reversal processing and the luminance value distribution VD2 after the reversal processing overlap with each other but also the distance from the extracted unevenness distribution De to the portion VD3 is a predetermined value or more, the determiner 204 does not need to calculate the similarity but may determine that the extracted unevenness distribution De corresponds to the abnormal unevenness. In these cases, not only the calculation of the similarity but also the extraction of the feature amounts of the extracted unevenness distribution De are unnecessary, but the extraction of the feature amounts may be performed.

After the determination by the determiner 204, the register 205 registers the determination result by the determiner 204 into the database 210 (Step S15). Specifically, the register 205 stores the specific unevenness distribution D extracted by the extractor 203 in the database 210, together with the feature amounts extracted by the determiner 204 from the specific unevenness distribution D and the determination result by the determiner 204 with respect to the specific unevenness distribution D. Further, the register 205 may store the wafer ID, the lot ID, and the device ID regarding the wafer W being a determination target, namely, an inspection target in the database 210, in association with the specific unevenness distribution D.

Note that when the operator who has confirmed the determination result by the determiner 204 confirms that there is an error in the determination result, the determination result by the determiner 204 is rewritten by the operator and then registered in the database 210.

The information processing for inspecting the wafer W including the information processing based on the imaging results of the wafer W by the inspection imaging apparatuses 55, 57, 63, 64 is the same as the information processing for inspecting the wafer W including the information processing based on the imaging result of the wafer W by the above inspection imaging apparatus 56.

<Main Effects>

As explained above, the information processing method according to this embodiment is a method of processing information for inspecting a substrate based on a captured image of the substrate, and includes: an acquisition step of acquiring the captured image of the substrate; and a creation step of creating a two-dimensional histogram H using a distance from a center of the substrate and a luminance value as axes regarding the acquired captured image of the substrate. The information processing method according to this embodiment further includes an extraction step of extracting a specific unevenness distribution D corresponding to heterogeneous unevenness (namely, non-concentric annular and non-concentric unevenness) in the captured image from the two-dimensional histogram H created in the creation step based on a predetermined domain definition. In the extraction step, a portion corresponding to annular unevenness M1 or concentric unevenness which occurs even if the wafer W is in a normal state in the two-dimensional histogram H is not extracted. The information processing method according to this embodiment further includes a determination step of acquiring a feature amount of the extracted specific unevenness distribution D extracted in the extraction step, and determining a type of the specific unevenness distribution D based on the feature amount. Therefore, according to this embodiment, it is at least possible to prevent the annular unevenness M1 or concentric unevenness occurring in the captured image of the wafer W even if the wafer W is in a normal state from being determined as abnormal unevenness. In other words, according to this embodiment, it is possible to accurately perform an inspection based on the captured image of the wafer W even if unevenness occurs in the captured image.

Further, conventionally, the binarization processing is directly performed on the captured image of the wafer W, and an abnormality determination is performed for a region extracted from the image after the binarization processing.

In contrast to the above, in this embodiment, the two-dimensional histogram H using the radial position r as an axis is once created from the captured image of the wafer W, and then the binarization processing is performed on the two-dimensional histogram H to make it into the luminance value distribution VD1, and the abnormality determination is performed on a region extracted from the luminance value distribution VD1, namely, the specific unevenness distribution D. Therefore, in this embodiment, the region being a target of the abnormality determination includes information on the radial position r important for the determination of unevenness unlike the conventional. In other words, in this embodiment, the region being the target of the abnormality determination can be handled as a shape feature in consideration of the radial position r important for the determination of unevenness. Therefore, according to this embodiment, the accuracy of the inspection based on the captured image of the wafer W can be improved.

Further, in the information processing method according to this embodiment, the determination step determines which of unevenness caused by a defect and normal unevenness the extracted unevenness distribution De corresponds to by referring to the database storing in advance which of the unevenness caused by a defect and the normal unevenness the specific unevenness distribution D corresponds to, for each specific unevenness distribution. Accordingly, it is possible to more accurately determine, for the extracted unevenness distribution, which of the unevenness caused by a defect and the normal unevenness the distribution corresponds to.

Further, in the information processing method according to this embodiment, the reversal processing regarding the luminance value axis direction based on the mode value of the luminance value is performed on the luminance value distribution VD1 obtained by projecting the two-dimensional histogram H on the two-dimensional plane, and the portion where the luminance value distribution VD1 before the reversal processing and the luminance value distribution VD2 after the reversal processing do not overlap with each other is extracted as the specific unevenness distribution D. Accordingly, it is possible to exclude a portion which should not be extracted as the specific unevenness distribution D in the luminance value distribution VD1, from the specific unevenness distribution D in accordance with the state of the captured image of the wafer W being an inspection target.

<Another Example of the Inspection>

The inspection of the wafer W based on the captured image of the wafer W according to this embodiment may be performed in parallel with the conventional inspection of the wafer W based on the captured image of the wafer W.

<Another Example of the Calculation of Similarity>

In an abnormal example, the similarity is calculated for all of the specific unevenness distributions D registered in the database 210, but the similarity may be calculated only for the specific unevenness distribution D corresponding to the base of the wafer W being an inspection target because the specific unevenness distribution D is affected by the base of the wafer W being an inspection target. In this case, the base of the wafer W being an inspection target and which of the bases the specific unevenness distribution registered in the database 210 corresponds to are decided, for example, based on the device ID.

<Regarding the Color of the Captured Image of the Wafer W>

Though the captured image of the wafer W is in a single color for simplification of the explanation in the above, the captured image of the wafer W is generally composed of three primary colors such as RGB (Red, Green, Blue). Therefore, actually, the information processing according to this embodiment is performed, for example, for each of R, G, B. In this case, in the case where the extracted unevenness distributions De overlap among RGB, the determination of normal/abnormal about the extracted unevenness distributions De is performed, for example, in a majority rule. In other words, the determination result common in two colors among the three colors of RGB is employed.

Further, the information processing according to this embodiment may be performed, for example, only for some of RGB. In this case, which of the colors the information processing is performed on is decided, for example, based on at least one of the wafer ID, the lot ID, and the device ID associated with the wafer W being an inspection target. Further, in this case, the similarity is calculated not for the specific unevenness distributions D corresponding to all of the colors registered in the database 210, but the similarity may be calculated only for the specific unevenness distribution corresponding to the color being an information processing target. Which of the colors the specific unevenness distribution registered in the database 210 corresponds to is decided, for example, based on at least one of the wafer ID, the lot ID, and the device ID.

<Another Example of the Feature Amount>

In the above example, the determiner 204 acquires the feature amounts regarding the shape of the specific unevenness distribution D as the feature amounts of the specific unevenness distribution D. In place of the above, the determiner 204 may extract the feature amounts of the specific unevenness distribution D using a learned model. The learned model concretely means, for example, a convolutional neural network (CNN) such as learned Alexnet. Besides, for the feature amounts of the specific unevenness distribution D in this case, for example, all of outputs from a fully connected layer of a CNN model are used.

Note that as the feature amounts of the specific unevenness distribution D, both of the feature amounts regarding the shape of the specific unevenness distribution D and the feature amounts extracted using the learned model may be used.

Other Modification Examples

In an abnormal example, the information processing for inspecting the wafer W including the information processing based on the imaging result of the wafer W is performed by the control apparatus 6 of the wafer treatment system 1, but may be performed by an information processing apparatus outside the wafer treatment system 1.

The embodiments disclosed herein are examples in all respects and should not be considered to be restrictive. Various omissions, substitutions, and changes may be made in the embodiments without departing from the scope and spirit of the attached claims.

EXPLANATION OF CODES

6 control apparatus
201 acquirer
202 creator
203 extractor
204 determiner
D specific unevenness distribution
De extracted unevenness distribution
H two-dimensional histogram
Im captured image
V luminance value
W wafer

What is claimed is:

1. An information processing method of processing information for inspecting a substrate based on a captured image of the substrate, the information processing method comprising:

acquiring the captured image of the substrate;

creating a two-dimensional histogram using a distance from a center of the substrate and a luminance value as axes regarding the acquired captured image of the substrate;

extracting a specific unevenness distribution corresponding to heterogeneous unevenness in the captured image from the two-dimensional histogram based on a predetermined domain definition; and acquiring a feature amount of the extracted specific unevenness distribution and determining a type of the specific unevenness distribution based on the feature amount.

2. The information processing method according to claim 1, wherein the determining determines which of unevenness caused by a defect and normal unevenness the specific unevenness distribution extracted in the extracting corresponds to by referring to a database storing in advance which of the unevenness caused by a defect and the normal unevenness the specific unevenness distribution corresponds to for each specific unevenness distribution.

3. The information processing method according to claim 2, further comprising registering a determination result in the determining in the database.

4. The information processing method according to claim 3, wherein the determining refers to the database in which the determination results in the determining at previous and earlier times are registered.

5. The information processing method according to claim 1, wherein the extracting performs reversal processing regarding a luminance value axis direction based on a mode value of the luminance value, on a luminance value distribution obtained by projecting the two-dimensional histogram on a two-dimensional plane using the distance from the center of the substrate and the luminance value as axes, and extracts a portion where the luminance value distribution before the reversal processing and the luminance value distribution after the reversal processing do not overlap with each other, as the specific unevenness distribution.

6. The information processing method according to claim 1, wherein the determining acquires a feature amount regarding a shape of the specific unevenness distribution as the feature amount of the specific unevenness distribution.

7. The information processing method according to claim 1, wherein the determining extracts the feature amount of the specific unevenness distribution using a learned model.

8. A computer-readable storage medium storing a program running on a computer of a controller which controls the information processing method according to claim 1 so as to cause an information processing apparatus to execute the information processing method.

9. An information processing apparatus for processing information for inspecting a substrate based on a captured image of the substrate, the information processing apparatus comprising:

an acquirer configured to acquire the captured image of the substrate;

a creator configured to create a two-dimensional histogram using a distance from a center of the substrate and a luminance value as axes regarding the acquired captured image of the substrate;

an extractor configured to extract a specific unevenness distribution corresponding to a heterogeneous unevenness in the captured image from the two-dimensional histogram based on a predetermined domain definition; and a determiner configured to acquire a feature amount of the extracted specific unevenness distribution and determine a type of the specific unevenness distribution based on the feature amount.

10. The information processing apparatus according to claim 9, wherein the determiner determines which of unevenness caused by a defect and normal unevenness the specific unevenness distribution extracted by the extractor corresponds to by referring to a database storing in advance which of the unevenness caused by a defect and the normal unevenness the specific unevenness distribution corresponds to for each specific unevenness distribution.

11. The information processing apparatus according to claim 10, further comprising a register configured to register a determination result by the determiner in the database.

12. The information processing apparatus according to claim 11, wherein the determiner refers to the database in which the determination results by the determiner at previous and earlier times are registered.

13. The information processing apparatus according to claim 9, wherein the extractor performs reversal processing regarding a luminance value axis direction based on a mode value of the luminance value, on a luminance value distribution obtained by projecting the two-dimensional histogram on a two-dimensional plane using the distance from the center of the substrate and the luminance value as axes, and extracts a portion where the luminance value distribution before the reversal processing and the luminance value distribution after the reversal processing do not overlap with each other, as the specific unevenness distribution.

14. The information processing apparatus according to claim 9, wherein the determiner acquires a feature amount regarding a shape of the specific unevenness distribution as the feature amount of the specific unevenness distribution.

15. The information processing apparatus according to claim 9, wherein the determiner extracts the feature amount of the specific unevenness distribution using a learned model.

* * * * *